(No Model.) 3 Sheets—Sheet 1.
G. R. SHELHAMER.
SULKY PLOW.
No. 508,992. Patented Nov. 21, 1893.
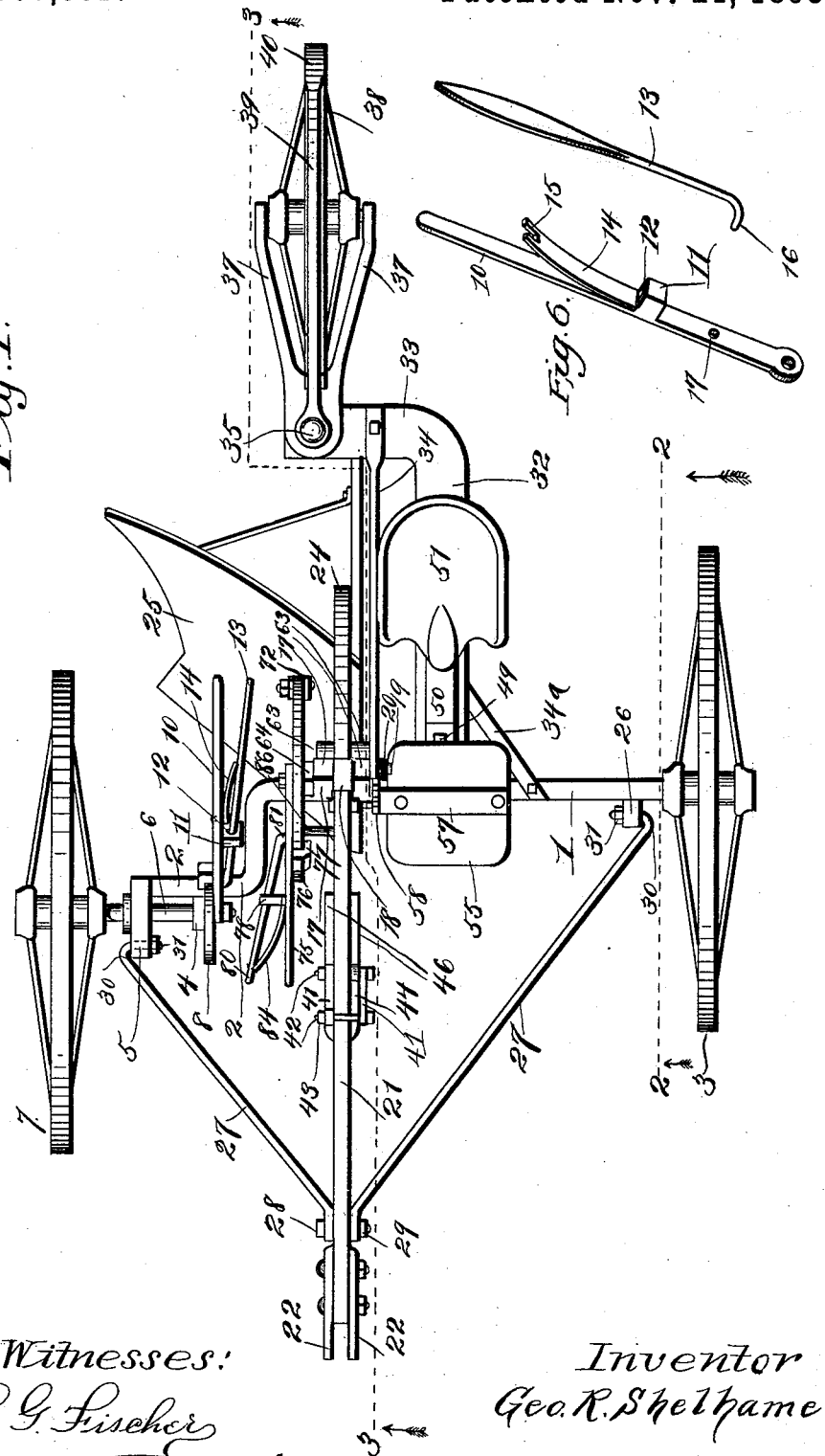
Witnesses:
F. G. Fischer
G. W. Thorpe
Inventor
Geo. R. Shelhamer.
By Higdon & Higdon
Attys.

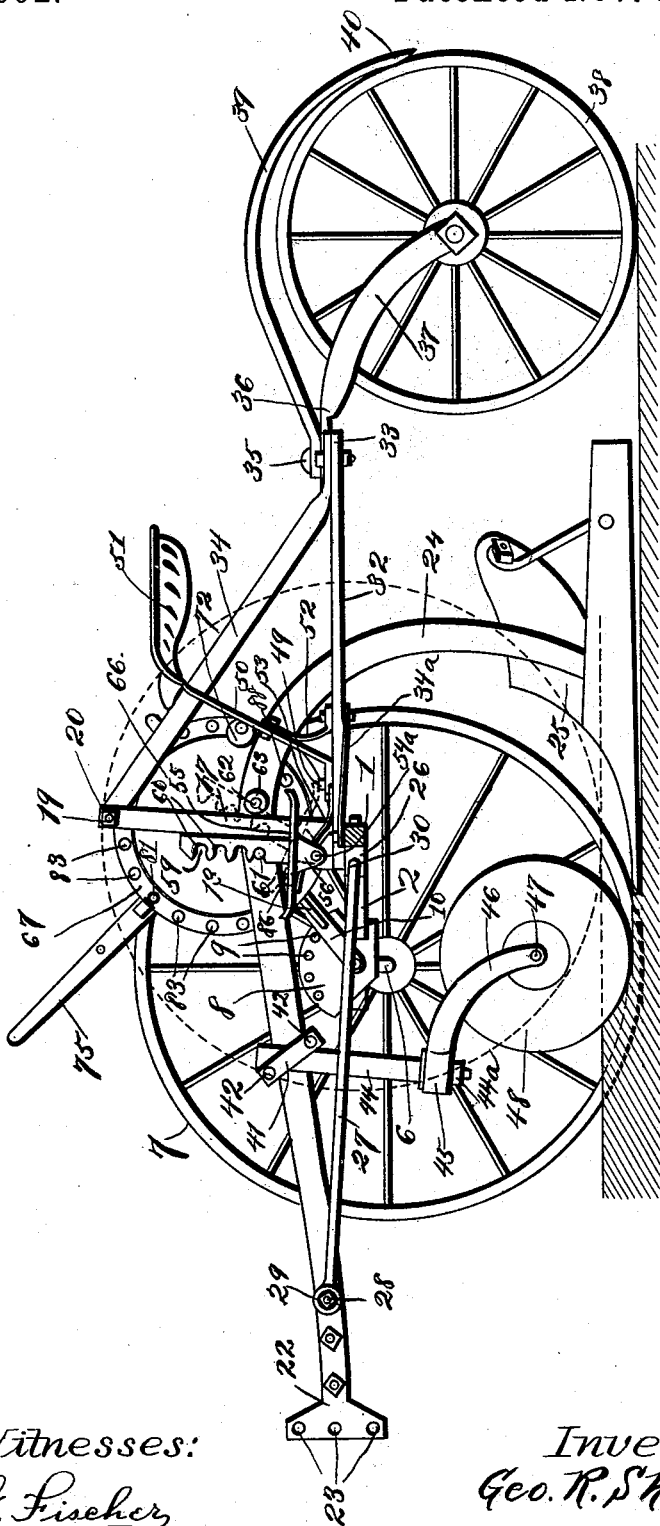

(No Model.)  3 Sheets—Sheet 3.
G. R. SHELHAMER.
SULKY PLOW.
No. 508,992. Patented Nov. 21, 1893.
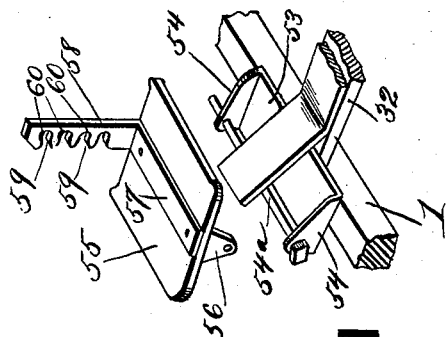
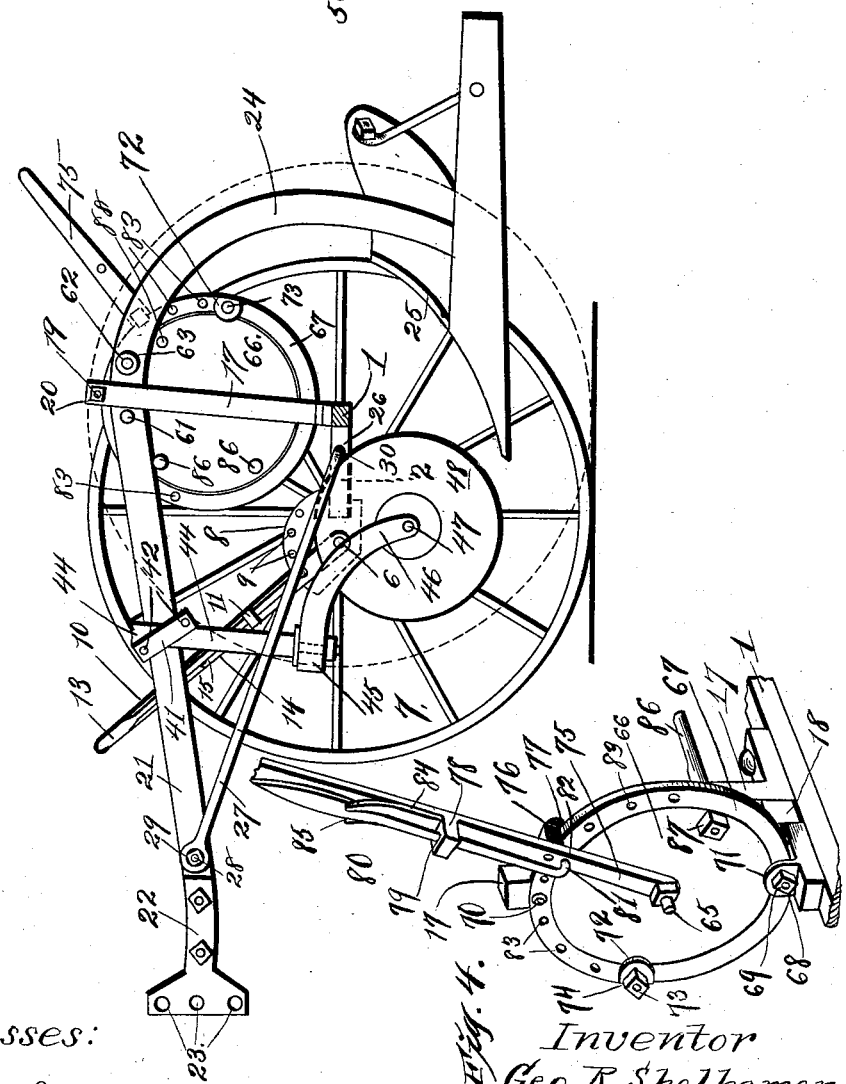
Witnesses:
F. G. Fischer
G. Y. Thorpe
Inventor
Geo. R. Shelhamer.
By Higdon & Higdon
Attys.

UNITED STATES PATENT OFFICE.

GEORGE R. SHELHAMER, OF OCHELTREE, KANSAS.

SULKY-PLOW.

SPECIFICATION forming part of Letters Patent No. 508,992, dated November 21, 1893.

Application filed May 26, 1893. Serial No. 475,559. (No model.)

*To all whom it may concern:*

Be it known that I, GEORGE R. SHELHAMER, of Ocheltree, Johnson county, Kansas, have invented certain new and useful Improvements in Sulky-Plows, of which the following is a full, clear, and exact description, reference being had to the accompanying drawings, forming a part hereof.

My invention relates to improvements in sulky plows; and the object of my invention is to produce means whereby the plow is prevented from being thrown upward when it comes in contact with a hard spot or patch of ground, and which as soon as the plow emerges from such hard ground will automatically release the plate to its original position; also to provide means whereby the plow may be used as a walking plow and operated independent of the sulky connection.

A further object is to produce mechanism whereby the plow may be vertically adjusted to and held at any desired distance from the ground.

With these objects in view my invention consists in certain peculiar features of construction and combinations of parts, as will be hereinafter described and pointed out in the claims.

In order that my invention may be fully understood, I will proceed to describe it with reference to the accompanying drawings, in which—

Figure 1, is a top plan view of a sulky plow constructed in accordance with my invention. Fig. 2, is a vertical sectional view taken on the line 2—2 of Fig. 1. Fig. 3, is a vertical section taken on the line 3—3 of Fig. 1, and showing the plow and colter-wheel raised above the surface of the ground. Fig. 4, is a detail perspective view of the mechanism by which the plow beam is raised. Fig. 5, is a perspective view of a portion of the axle and showing detached therefrom the platform by which the plow is locked in its operative position when in hard ground. Fig. 6, is a detail perspective view of the lever and spring actuated catch for operating the adjustable wheel.

In the drawings, 1 designates the axle which is cranked at one end at 2, and mounted revolubly upon the other end of the axle is the carrying wheel 3. The cranked portion 2 of the axle extends preferably forward as shown, and has secured to and projecting from its front side the bearing blocks 4 and 5, in which is revolubly and horizontally mounted the crank-shaft 6; the outer end of said shaft carrying loosely thereon the wheel 7. A segment plate 8 is carried by the cranked section 2 of the axle at the inner side of the bearing 4, and is formed with a series of holes or apertures 9 arranged concentric to the axis of the shaft 6. A lever 10 is keyed or otherwise rigidly carried by the crank-shaft 6 and adjacent to the segment plate 8, and a washer and retaining nut are secured upon the inner end of the shaft. A block 11 is secured to the inner side of the lever and a catch 13 is guided in an opening 12 formed through said block. This catch widens gradually from a suitable distance above the bearing block 11, and the upper bifurcated end 15 of a spring 14 carried by the lever 10, engages said catch above the block 11 and at the point where said lever begins to gradually widen. The lower end of the catch is bent horizontally outward at 16, and passing through an opening 17 of the lever 10 engages one or the other of the holes or apertures 9 of the segment plate 8. The hole 12 of the bearing block 11 is large enough to allow of sufficient pivotal movement of the spring actuated catch to allow the end 16 thereof to be withdrawn from a hole or aperture of the segment plate, and the tapering formation of the catch above the block and where it is grasped by the bifurcated end of the spring 14, prevents any tendency of the catch to move vertically through the hole or opening of the block 11.

Bolted or otherwise firmly secured upon the axle 1 adjacent to the cranked portion 2 thereof, and extending upwardly, and leaning slightly to the rear are the parallel standards 17, and said standards have interposed between their upper and lower ends the separating blocks 18. A bolt or tie rod 19 passes through the upper ends of said standards and also through the interposed separating block 18, and has its outer and projecting end engaged by a retaining nut 20.

Extending longitudinally of this machine and guided from lateral movement between the standards 17 is the plow beam 21, and carried at the forward or front end and secured thereto by bolts and nuts in the usual manner are the clevis forming plates 22, which are provided with the usual series of holes or apertures 23. The rear end of the plow beam is curved vertically downward at 24, and carries upon its lower end a plow 25 of the usual construction. Secured to the front side of the axle, and adjacent to the carrying wheel 3 thereof, is a bearing block 26, and to securely brace the front end of the plow beam from lateral movement, the obliquely arranged brace rods or bars 27 are provided; these rods being pivotally mounted at their front ends upon a bolt 28 which passes also through the plow beam, and has its projecting end engaged by a retaining nut 29, and have their rear ends bent at 30 to extend inwardly and parallel with the axle, and are passed through the bearing blocks 5 and 26, and have their projecting ends engaged by the retaining nuts 31.

From the foregoing description it will be seen that the plow beam is free to move vertically between the standards 17, but is braced from lateral movement near its rear end by said standards, and near its front end by the pivotal brace bars 27.

Bolted at its front end upon the axle and adjacent to the standards 17 is a horizontal plate or bar 32; said bar extending rearwardly and horizontally for a suitable distance, and is then bent at 33 to extend transversely of the machine and toward the side of the machine occupied by the cranked portion of the axle. To support this bar in its horizontal position a brace rod 34 is provided; said rod being bolted at its rear end to the extension 33 of the horizontal bar or plate 32, and at its upper end is mounted upon the tie rod or bolt 19, and is retained thereon by the nut 20. The horizontal bar or plate 22 is further braced by the brace bar 34ª which is bolted at its opposite ends upon the axle, and to the under side of said bar or plate a suitable distance rearward of the axle. Pivotally mounted at its front end upon a bolt 35 passing vertically therethrough and also through the outer end of the extension 33, is a plate 36; said plate being bifurcated to form the rearwardly extending and downwardly curved branch arms 37.

Located between the branch arms 37 is the caster wheel 38, the opposite ends of the spindle of which are loosely journaled in the free or outer ends of the branch arms 37. Pivotally mounted also upon the vertical bolt 35 and upon the plate 36, is the scraper plate 39, the rear end of which is sharpened at 40, and is adapted to scrape or remove all dirt which might otherwise cling to the caster wheel. An inclined clip comprises the side plates 41 which are arranged at opposite sides of the plow beam a suitable distance forward of the standards 17, and are connected at their upper and lower ends respectively by the cross bolts 42; one of these bolts being arranged at the upper side and the other at the lower side of the plow beam, and having their projecting ends engaged by the retaining nuts 43. Extending upwardly and approximately in vertical position, and interposed and adapted to be clamped between one side of the plow beam and one of the plates 42 of the inclined clip is a standard 44, and pivotally mounted upon the lower end of said standard is a casting 45; said casting being bifurcated to form the downwardly and rearwardly extending branch arms 46, which engage loosely the opposite ends of the spindle 47 of the colter-wheel or sod cutting-disk 48, which is thus normally supported in line with and a slight distance forward of the point of the plow. A retaining nut 44ª engages the lower end of the standard 44, and supports the casting 45 in position. When desired the colter-wheel or cutting disk may be adjusted vertically toward or from the ground, and may be also longitudinally adjusted upon the plow beam toward or from the point of the plow, as will be seen from the construction illustrated.

Secured by a bolt 49 upon the bar or plate 32 and adjacent to the axle is the front and lower end of the spring plate 50, which carries at its upper end the seat 51 in the usual manner. This plate is further braced by the spring plate 52, which is bolted at its opposite ends to the spring plate 50 and the horizontal plate or bar 32.

Secured upon the upper side of the bar or plate 32 and preferably by the same bolts which secure the bar or plate 32 upon the axle, is the transversely extending plate 53, which is formed at each end with the longitudinal and upwardly extending flange 54, and extending transversely of the machine and passing through the forward ends of said upwardly extended flanges is the tie bolt 54ª; said tie bolt also passing loosely through the depending ears 56 of a foot-platform or plate 55; said ears 56 bearing at the inner sides of the flanges 54. Secured centrally of the foot platform 55 and extending transversely of the machine is a bar 57, which is formed at the end adjacent to the standards 17 with the upwardly projecting arm 58; said arm being provided in its front edge with a series of notches or recesses 59 which are preferably enlarged slightly at the rear and upper sides at 60; the object of this construction will be hereinafter explained. This platform 55 is normally held by means of the presser spring 55ª, which is held at its rear and lower end securely beneath the front end of the spring plate 50, and has its upper and free end bearing against the under side of said platform, in the position shown in dotted lines Fig. 2. Journaled loosely upon each end of a pin 62 extending transversely through the plow beam adjacent to the rear sides of the standards 17 are the anti-friction rollers 63, which are adapted to roll against the rear side of the standard 17 as the plow beam is vertically raised or lowered, as hereinafter explained.

When the plow is in operation and comes in contact with a hard spot or patch in the ground the tendency of the plow is to rise, which would cause the furrow from that point to the point where the plow emerged from the hard ground to be of less depth than the preceding and succeeding portions, or too shallow. By means of this pivotal and spring actuated platform having the notched arm 58, as soon as the plow strikes such hard ground the driver with his foot pivotally operates the platform and throws one or the other of the notches 59 into engagement with the pin 61 projecting outwardly from the adjacent side of the plow beam and forward of the standards 17. The tendency of said hard ground being to lift the plow, the said pin 61 is held firmly against the enlargement 60 at the upper sides of the rear or inner end of said notches, and thus prevents the spring actuated platform from being disconnected therewith. Immediately, however, the plow emerges from said hard ground the upward pressure upon the plow is removed, and the pin 61 is disengaged from the enlarged portion 60 of the recess or notch 59, and the spring 53 bearing at the under side of the platform and forward of its pivotal point causes it to move rearwardly and be disengaged from said pin automatically. A bar 64 is securely bolted or otherwise secured to the outer side of the standard 17 adjacent to the cranked portion of the axle, and arranged vertically and adjacent to said bar is a disk 66, which is surrounded peripherally and supported by an annulus or ring 67; said annulus or ring 67 being secured rigidly against the outer side of the bar by means of the stub-bolt 68 which projects outwardly from the lower end of said bar and passes through said band or ring, and is engaged at its outer end by a retaining nut 69, and by the screw bolt 70, the head of which lies flush with the outer side of said band or ring, and engaging the upper end of the bar 64. To guide the disk 66 in its revoluble movement as hereinafter referred to, a guide plate 71 is carried upon the stub-bolt 68, and bearing against the outer side of the band or ring 67 overlaps and lies against the outer face of said disk. A pair of similar plates 72 are located one at each side of said disk, and mounted upon the opposite ends of a through bolt 73, and are retained in position by the nut 74. Mounted upon the pin 65 projecting centrally from the outer side of the disk 66 and also secured to move with the said revoluble disk 66 is a lever 75 which projects upwardly for a suitable distance. A block 76 carried by said lever extends over and adjacent to the periphery of the band or ring 67, and is formed with a depending tongue 77 which fits against the opposite side of said band or ring. A block 78 is carried at the outer side of said lever a suitable distance outward of the block 76, and is formed with a hole or aperture 79, through which passes the catch 80; said catch being bent to form the horizontal portion 81 at its lower end, which passes through a hole 82 in said lever and is adapted to engage one or the other of a series of holes or apertures 83 of the band or ring 67. A spring 84 is also carried by said lever and its bifurcated upper end 85 engages the catch 80 a suitable distance above the block 78. By this construction it will be seen that the lever 80 which is adapted to pivotally operate in the hole 79 of the block 78, may be operated so that its end 81 may be with-drawn from engagement with any of the apertures of the ring or band, so that the disk 66 may be revolubly operated to cause the pin 86 projecting horizontally from its inner side to lift the plow beam or to allow the same by gravity to descend, as hereinafter explained, the said pin 86 being secured to the disk 66 by a nut 87.

The general operation of the device is as follows: When plowing upon even ground the lever 10 mounted upon the crank shaft 6 is in its forward position as shown in Fig. 3, and when it is desired to cause the wheel carried by said crank shaft to occupy and travel in a furrow or where the ground is lower at one side than at the other, this lever is grasped by the driver and pulled rearwardly, the spring actuated catch being first compressed to disengage it from segment plate 8, and the catch is allowed to engage one of the other holes or apertures of said plate. This movement throws the carrying wheel 7 mounted upon the crank shaft 6 downward, so that the horizontal position of the plate relative to the axle will be maintained. When it is desired to lift the plow and colter-wheel from the ground in driving to or from the field, and also to clear obstructions in its path, the lever 75 is operated, so that the pin 86 thereof will engage the under side of and lift the plow beam. By moving the lever in the opposite direction the plow beam can be lowered, the beam being guided in its vertical movement by the anti-friction rollers 63. The large caster wheel assists in carrying the weight of the driver, and also the plow, plow-beam and colter-wheel when the plow is raised as described, and in turning, the caster-wheel follows in the line of the furrow and by not crossing and dragging over the adjacent furrows, as would be the case did it not follow the line of the plow, the plow is turned more easily and in a more confined space. If desired, the lever may be arrange so that by operating it forward the driver may raise the plow, and by pulling it rearward the plow may be allowed to descend. To do this, the pin 86, is passed through a hole 83, at a different point on the disk 66, and rearward of the standards 17. It will thus be seen that by throwing the lever 67 forward, the pin will move rearwardly and upwardly and coming in contact with the under side of the plow beam, the plow will be raised. By reversing the movement of the lever the plow-beam is allowed to descend. By throwing the lever 75 forward, the pin 86 may be locked at any desired point and the plow beam will rest thereon, thus regulating the depth of the cut, the gaging of the cut of the plow by means of the clevis bolt (not shown) engaging one or the other of the holes 23 being first determined on. The plow may now be used as a walking plow, and operated by a boy. The inclination of the standards 17 approximately corresponds to the line the forward ends of the pivotal brace bars 27 would follow as the plow is lifted out of the ground; this arrangement forms a guide which causes the beam lifted at its center by the pin 86 to move upward positively so that the plow shall rise in a horizontal plane, and the double-tree (not shown) is elevated therewith. When the plow beam is raised the rollers 63, lifted vertically come in contact with the rear sides of the standards and prevent any tilting of the plow-beam. If desired, I may also arrange the spring so that it will bear against the under side of the platform 55 in rear of its pivotal point, so that the plow may be held firmly to its work in hard ground. By applying pressure upon the rear end of the platform, it may be disengaged from the beam-pin.

From the above description, it will be seen, that I have produced a sulky plow which is simple, strong, durable and comparatively inexpensive of construction; which may be induced to furrow hard earth to the same depth as the softer earth; which may be raised out of the path of obstructions, and which may be turned easily and in a confined space.

Having thus described my invention, what I claim as new, and desire to secure by Letters Patent, is—

1. In a sulky plow, the combination with a beam having a pin, and a plow at its lower end, an axle, and wheels, of a foot-platform pivotally supported upon the axle and having an arm adapted to engage the pin of the plow beam, substantially as set forth.

2. In a sulky plow, the combination with a plow beam having a pin, and a plow at its lower end, an axle, and wheels, of a foot-platform pivotally supported upon the axle and having a notched arm adapted to engage the pin of the plow beam, substantially as set forth.

3. In a sulky plow, the combination with a plow beam having a pin, and a plow at its lower end, an axle and wheels, of a foot-platform pivotally supported upon the axle and having a notched arm engaging the pin of the plow beam, and a spring adapted to disengage the notched arm from said pin, substantially as and for the purpose set forth.

4. In a sulky-plow, the combination with the plow carrying beam, an axle, and wheels mounted thereon, parallel guide-standards supported upon the axle, one at each side of the plow-beam, and brace-bars pivotally connecting the front portion of the plow-beam with the axle, of an annulus or ring having holes or apertures, a disk revolubly supported in said annulus or ring, and having a pin projecting beneath the plow-beam, and a lever or arm carried by the revoluble disk and provided with a spring-actuated lever having one end adapted to engage one or the other of the holes or apertures of the annulus or ring, substantially as set forth.

5. In a sulky plow, the combination, with a beam having a plow upon its lower end, an axle, and wheels, of a revoluble disk having a pin, and a lever arm, so that when the lever is operated the disk will be revolved and the plow beam raised, substantially as set forth.

6. In a sulky plow, the combination with a beam having a plow at its lower end, an axle, and wheels, and guide standards at each side of said plow beam, of a revoluble disk, having a pin projecting beneath the plow beam, so that when the disk is operated the pin will engage and lift the plow beam vertically between said guide standards, substantially as forth.

7. In a sulky plow, the combination with a plow beam having a plow at one end, an axle, and wheels, and guide standards at each side of said axle and anti-friction rollers carried by the plow beam at the rear side of said guide standards, and a revoluble disk, and a band or ring surrounding peripherally said revoluble disk and having a series of holes, and a lever arm secured to operate with said revoluble disk, and having a spring actuated catch, adapted to engage one or the other of the holes of the band or ring, substantially as set forth.

In testimony whereof I affix my signature in the presence of two witnesses.

GEORGE R. SHELHAMER.

Witnesses:
S. R. HOGUE,
T. A. DAVIS.